United States Patent [19]
Allert

[11] Patent Number: 6,113,306
[45] Date of Patent: Sep. 5, 2000

[54] SECURING RING ("C" CLIP)

[75] Inventor: Kurt Allert, Aberndorf, Germany

[73] Assignee: Hans Oetiker AG, Horgen, Switzerland

[21] Appl. No.: 09/007,962

[22] Filed: Jan. 16, 1998

[30] Foreign Application Priority Data

Jan. 21, 1997 [DE] Germany ............... 197 01 857

[51] Int. Cl.[7] .................................................. F16B 21/00
[52] U.S. Cl. .................... 403/344; 403/344; 403/289; 411/518
[58] Field of Search .................... 403/155, 154, 403/344, 319, 289, 290; 411/518, 517, 521

[56] References Cited

U.S. PATENT DOCUMENTS

| | | | |
|---|---|---|---|
| 2,025,848 | 12/1935 | Collis .................................... | 85/8 |
| 2,491,310 | 12/1949 | Heimann ............................... | 411/518 |
| 2,595,787 | 5/1952 | Heimann ............................... | 411/518 X |
| 3,126,089 | 3/1964 | Hügli ................................... | 198/171 |
| 3,807,885 | 4/1974 | Coski ................................... | 403/344 |
| 4,183,280 | 1/1980 | Hashimoto ............................ | 411/518 |
| 4,242,775 | 1/1981 | Eickmann ............................. | 411/518 X |
| 4,459,119 | 7/1984 | Beijer ................................... | 411/518 X |

FOREIGN PATENT DOCUMENTS

| | | | |
|---|---|---|---|
| 189859 | 5/1957 | Austria . | |
| 532373 | 10/1956 | Canada ................................ | 411/518 |
| 886005 | 1/1962 | United Kingdom ................... | 411/518 |

Primary Examiner—Lynne H. Browne
Assistant Examiner—John R. Cottingham
Attorney, Agent, or Firm—Darby & Darby

[57] ABSTRACT

The invention relates to slotted fastening ring for making a formfitting connection by compressing or expanding, respectively, the slotted fastening ring during installation or removal, respectively. It is provided that the fastening ring (1) is made from an essentially non-resilient cold-formable material (3) and that the ring tips (10, 11) between which the slot (9) is formed, are spaced apart—when the fastening ring (1) is not installed—such as to be capable—for the purpose of installing the ring (1)—of being bent towards each other under plastic deformation, so that the fastening ring (1) attains a closed position, with the inside opening (7) of the ring taking on a circular or a substantially circular contour (8).

9 Claims, 2 Drawing Sheets

SECURING RING ("C" CLIP)

BACKGROUND OF THE INVENTION

1. Field of the Invention

The present invention relates to slotted fastening ring for making a formfitting connection by compressing or expanding, respectively, the slotted fastening ring during installation or removal, respectively.

2. Description of the Related Art

Fastening rings of the type described above are known in the art as Seeger rings or circlip rings. These rings are used to secure the axial position of components, for example, on a shaft or inside a bore. When the respective fastening ring is installed or removed, the ring is extended outwardly or inwardly, as the case may be, with the resilient forces urging the ring which is made from an elastic material, back to its original or ground state. The ground state is defined as the state wherein the fastening ring is not installed. The conventional fastening rings are formed as spiral springs, wherein the resilient properties in the axial direction are essentially inconsequential for attachment on a shaft. The known rings engage with an annular groove when secured on a shaft. When a Seeger ring is used, the Seeger ring is spread apart with Seeger ring pliers, whereafter the ring is pushed onto the shaft in an axial direction. When a circlip ring is used, the circlip ring can be pushed into the groove on the shaft in the radial direction by expanding the ring against the resilient bias.

Moreover, for securing a component on a shaft in the axial direction with the help of a groove, a U-shaped part is commonly pushed with its two legs onto the shaft in the radial direction and then plastically deformed. In this manner, at least the directions of the end regions of the legs converge, thereby guaranteeing that the component is secured in the axial direction. Disadvantageously, however, the U-shaped clip engages with the circumferential annular groove of the shaft only along limited regions, thereby impairing its capability to absorb axial forces.

SUMMARY OF THE INVENTION

It is the object of the invention to provide a simple fastening ring of the aforedescribed type which engages formfittingly in the best possible manner with the component to which the ring is secured and which therefore is capable of withstanding large loads.

This object is solved by the invention in that the fastening ring is made from essentially non-resilient cold-formable material and that the ring tips of the between which the slot is formed—when the fastening ring is not installed—, are spaced apart in such a way as to be capable—for installation—of being bent towards each other under plastic deformation, so that the fastening ring attains a closed position, with the inside opening of the ring taking on a circular or a substantially circular contour.

As opposed to the Seeger ring or the circlip ring, respectively, the fastening ring of the invention is consequently not made from a resilient material, but from a material which is deformed during installation. The fastening ring assumes as a result of the compression a new shape which is preserved. It is, however, understood that although the shape of the non-resilient, cold-formable material mentioned in the patent claim can be changed through deformation, the material still exhibits residual resilient properties. The fastening ring is made, for example, from soft (non-hardened) steel. Preferably, the material can be deformed multiple times, i.e. the installed fastening ring can be deformed again when opened and can subsequently be installed again. Preferably, this operation can be carried out several times without causing the ring to break. According to claim 1, the ring is compressed such as to attain a "closed" state. The word "closed" does not imply that the two ring tips have to be juxtaposed when the ring is installed, but a gap is allowed to exist between the two tips. This gap, however, is smaller than the gap which existed between the ring tips before the fastening ring was installed. The fact that the inside opening of the ring assumes a circular or an approximately circular contour after installation, ensures that—when the fastening ring is inserted in the groove of a shaft—the entire contour of the ring is supported by the walls of the groove, so that large axial forces can be absorbed safely and without difficulty. As opposed to the conventional Seeger ring and/or the circlip ring and as a result of the specifically devised deformation, the fastening ring of the invention can be pushed deeper onto the component, such as the aforedescribed shaft, thereby making optimum contact with the shoulder for attaining a very large retention force. For attaining the approximately circular shape of the inside opening when the ring is installed, the inside opening of the ring has—when the fastening ring is not installed—a special contour which takes into consideration the deformation which takes place during installation, i.e. the specific contour is selected and matched to the subsequent deformation in such a way that the circular or approximately circular contour, respectively, is attained after installation.

Moreover, tool engaging means for compressing or expanding, respectively, the fastening ring are advantageously formed in the region of the ring tips. More particularly, the tool engaging means can have the form of openings, preferably of circular openings. Consequently, conventional Seeger ring pliers can be used for deforming, i.e. compressing or expanding, the rings. When compared with a conventional Seeger ring, the circular openings are larger than those of a conventional Seeger ring since relatively large forces are required for the deformation described above. Since the circular openings have a large diameter, heavy-duty Seeger ring pliers can be used.

According to a further improvement of the invention, the contour of the inside opening of the ring—when the ring is not installed—is comprised of several radii which change gradually into each other, wherein the lengths of abutting radii are different from each other and the respective centers of these radii are also located at different points. "Changing into each other" does not imply that the corresponding radii have to be in intimate contact with each other (which is however possible). Instead, transitional curve sections can be disposed between these radii.

When the fastening ring is not installed, the fastening ring can be viewed as being subdivided into two ring halves, wherein the contour of the opening of the ring in the first region located diametrically opposed to the slot has a radius which is as large or approximately as large as the radius of the inside opening of the ring when the fastening ring is installed. Preferably, on each ring half, a second region abuts the first region wherein the radius of the contour of the inside opening of the second region—when the fastening ring is not installed—is twice as large or approximately twice as large as the radius in the first region. Finally, on each ring half, a third region abuts the second region wherein the radius of the contour of the inside opening of the third region—when the fastening ring is not installed—is as large or approximately as large as the radius of the first region. As a result of this design of the contour of the inside opening, the inside opening of the installed ring is circular or approximately circular. The center of the radius of the first region is located at a point which corresponds to the actual center of the circular inside opening of the ring after installation. The center of the radius of the second region is displaced with respect to the aforementioned first center. The center of the radius of the third region again is also displaced with respect to the two aforementioned centers.

It is furthermore advantageous if the minimum width of the slot—when the fastening ring is not installed—is slightly larger than or is as large as twice the radius of the contour of the inside opening of the ring in the first region. This slot width then is the same as or is somewhat larger than the diameter of the shaft in the region of the groove, so that the ring can be inserted into the groove in the radial direction without having to be spread apart.

Finally, the fastening ring is advantageously formed as a stamped sheet metal part, making a simple and cost-effective manufacturing process feasible.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

The drawings illustrate the invention with reference to an embodiment. In the drawing is shown in.

DETAILED DESCRIPTION OF THE PRESENTLY PREFERRED EMBODIMENTS

Figure 1:
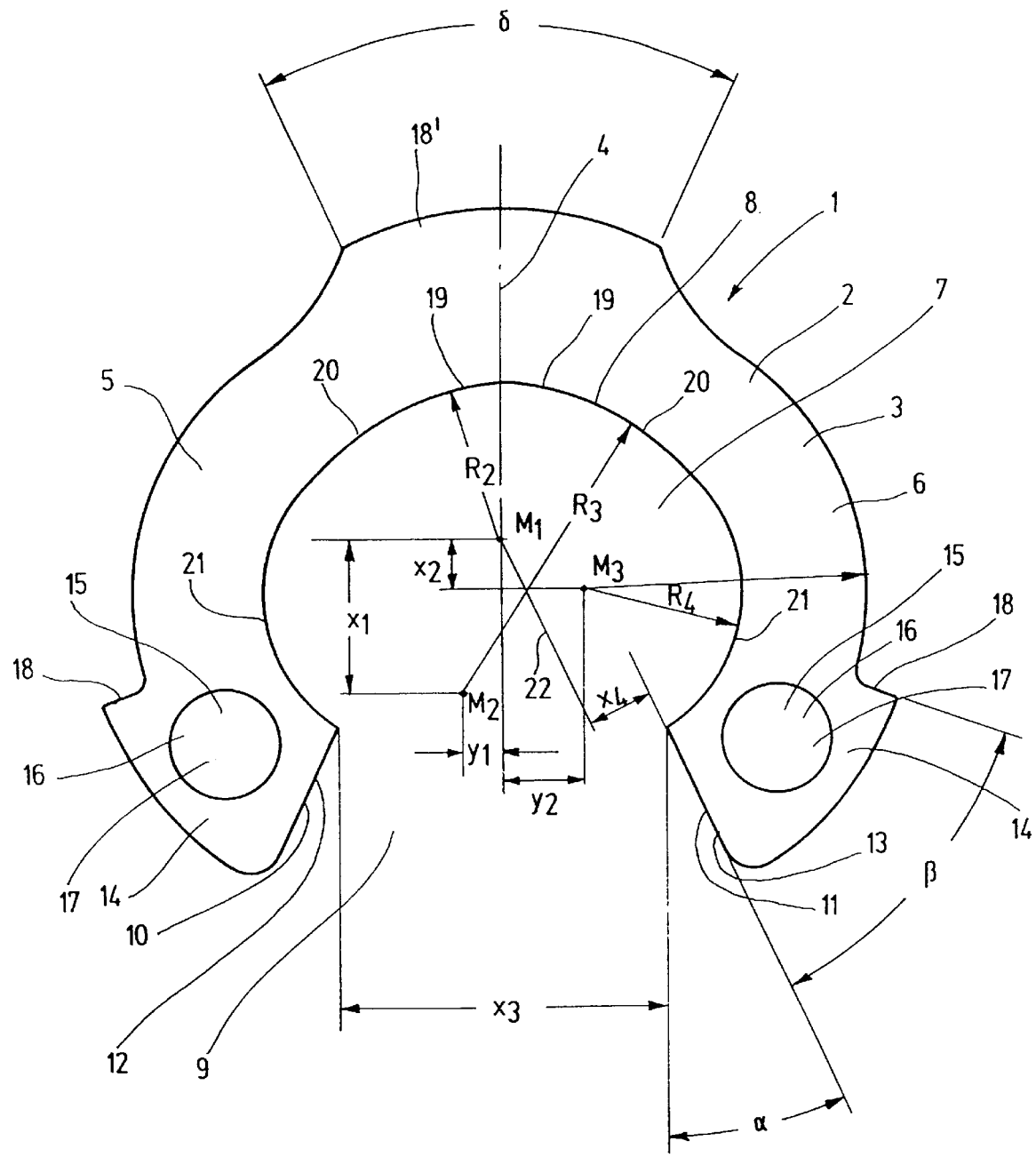
FIG. 1 a fastening ring before installation.

Referring now to FIG. 1, there is shown a slotted fastening ring 1 formed as a stamped sheet metal part 2. The ring is essentially made from a non-resilient cold-formable material 3.

Figure 2:
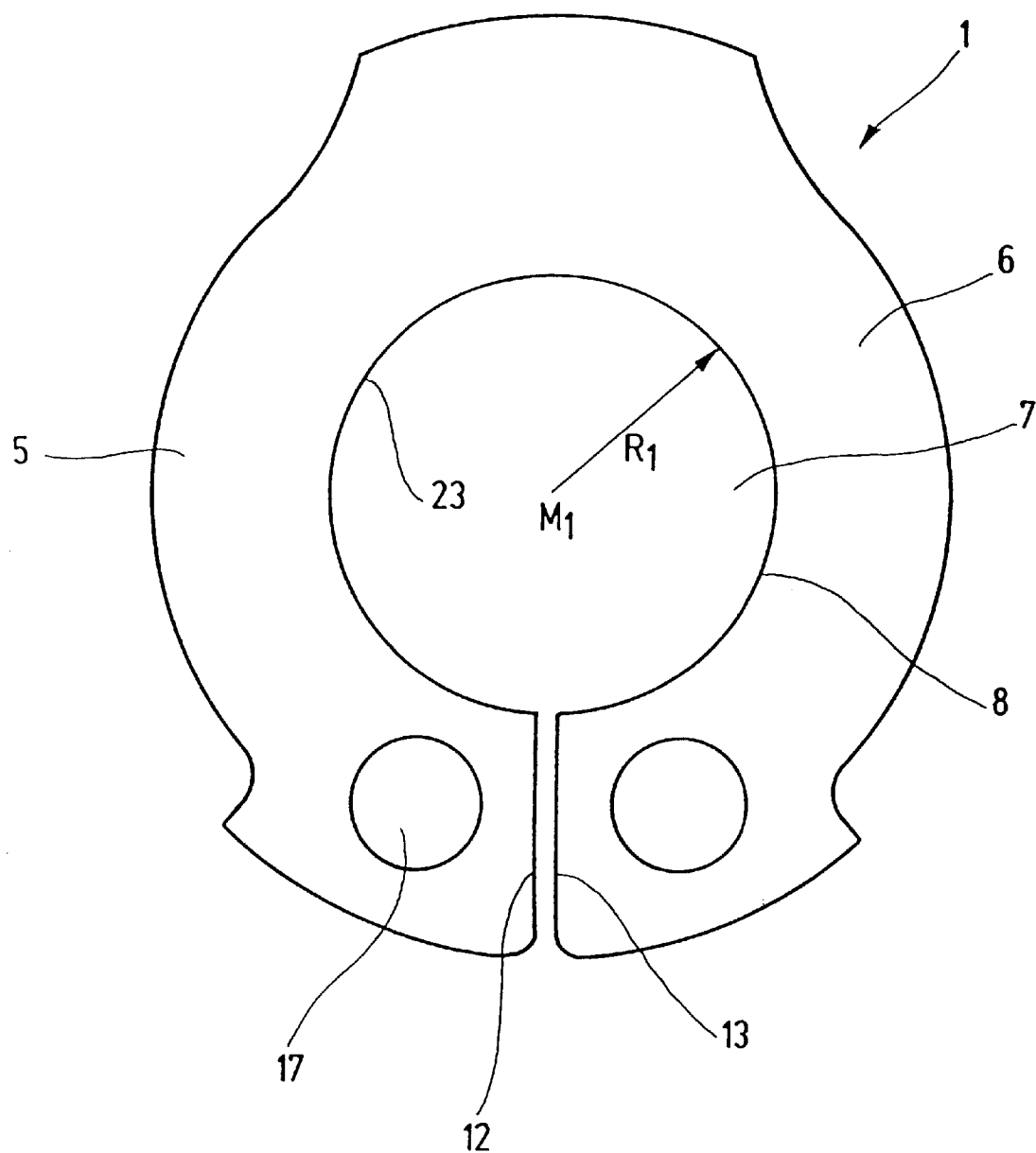
FIG. 2 the fastening ring of FIG. 1 in the compressed state after installation.

With reference to an imaginary line of symmetry 4, the fastening ring 1 comprises two ring halves 5 and 6 which are made as a single piece and which are formed such as to represent mirror images of each other with respect to the line of symmetry 4. In the following, only one of the ring halves 5, 6 will be described in detail for sake of simplicity. The same reasoning then applies to the respective other ring half 5, 6. The fastening ring 1 has an inside opening 7 defining a contour 8. On one side, the contour 8 extends up to a slot 9 formed between the ring tips 10, 11. The marginal edges 12, 13 of the slot which correspond to the ring tips 10, 11, form an angle $\alpha$ with the line of symmetry 4. This angle $\alpha$ is 25.42° for a fastening ring 1 with a radius $R_1$ of 10 mm after installation (see FIG. 2). The following angle measurements and dimensions apply to a fastening ring of this type. For a larger or smaller fastening ring 1 of the invention, the dimensions and angles can be converted accordingly by using the values described in conjunction with the present application.

In the region 14 abutting the ring tips 10, 11, there is provided a tool engagement means 15 formed as an opening 16, in particular as a circular hole 17. In order to accommodate a circular hole 17 with the largest possible diameter, the region 14 includes a radial protuberance in form of a step 18 extending outwardly in the radial direction. The region 14 extends over an angle $\beta$ of 45°.

In diametrically opposed relationship to the slot 9, the fastening ring 1 is provided with another step 18' which extends radially outwardly, covering an angle $\delta$ of approximately 60°. For each ring half 5 and 6, the contour 8 of the inside opening 7 of the ring comprises a first region 19 located diametrically opposed to the slot 9. The respective first region 19 is contiguous with a second region 20 which in turn joins a third region 21 extending to the respective ring tip 10, 11. The contour 8 of adjacent regions 19 and 20 as well as regions 20 and 21 of each ring half 5, 6 has different radii $R_2$, $R_3$, $R_4$, with the centers $M_1$, $M_2$ and $M_3$ of the respective radii $R_2$, $R_3$, $R_4$ located at different points. The center $M_1$ of FIG. 1 before installation is identical to the center $M_1$ of the inside opening 7 of the ring after installation (see FIG. 2). The center $M_1$ is located on the line of symmetry 4. The radius $R_2$ is 5 mm. The contour 8 in the second region 20 has a radius $R_3$ of 10 mm. The center of radius $R_3$ is the center $M_2$. The center $M_2$ is displaced from the center $M_1$ such as to form a separation $x_1$ of 4.844 mm parallel to the line of symmetry 4 and a separation $y_1$ of 1.239 mm perpendicular to the line of symmetry 4. The radius $R_4$ is 5 mm and has a center $M_3$, which is spaced apart from the center $M_1$ by a distance $x_2$ of 1.646 mm parallel to the line of symmetry 4. In the direction perpendicular to the line of symmetry 4, the center $M_3$ maintains a separation from the line of symmetry 4 of $Y_2$=2.597 mm. The minimum width of the slot 9 is $x_3$=10.382 mm. This is the same separation—referenced to the width of the ring -as the distance between the end points of contour 8. The marginal edges 12 and 13 of the slot extend in a straight line; when the marginal edges 12 and 13 of the slot are extended along an imaginary line, then this imaginary line is spaced apart in relation to an imaginary straight line 22 extending parallel through the center $M_1$ by $x_4$=2.149 mm.

The fastening ring 1 depicted in FIG. 1 is installed by pushing the ring onto a component, for example into an annular groove of the component, in a radial direction. The ring can be inserted into the slot 9. After the fastening ring 1 is pushed on in the radial direction, the ring is plastically deformed and thereby takes on the shape depicted in FIG. 2. This operation is preferably carried out with the help of Seeger ring pliers, wherein the pin-shaped jaws are inserted into the circular holes 17 of the two ring halves 5 and 6. The ring is deformed, with the two ring tips moving towards each other, by pressing the pliers together, thereby compressing the fastening ring 1. After the deformation, the two marginal edges 12 and 13 of the slot are, for example, oriented parallel to each other, with a very small gap therebetween. As a result, the deformation has urged the contour 8 of the inside opening 7 of the ring into a circular shape. Consequently, the entire contour 8 engages in the groove of the component, thereby creating a large support surface permitting large axial loads without sustaining damage. If the fastening ring is to be removed, then the fastening ring 1 only has to be bent back into the open position with the Seeger ring pliers (or with another tool), whereby the ring again takes on the shape depicted in FIG. 1. Preferably, the ring can be opened and closed several times without causing the material to break.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A slotted fastening ring for making a formfitting connection by respectively compressing or expanding the slotted fastening ring during installation or removal, comprising: a non-resilient cold-formable material and ring tips, said ring tips defining a slot, said ring tips being spaced apart, when the fastening ring is not installed, so as to be deformable towards each other under plastic deformation to a closed position with an inside opening of the ring forming a substantially circular contour, wherein the contour of the inside opening of the ring, when the ring is not installed, defines a plurality of radii ($R_2$, $R_3$, $R_4$) which change gradually into each other or are adjacent to each other, respectively, wherein abutting radii ($R_2$, $R_3$, $R_4$) have different lengths and have respective centers ($M_1$, $M_2$, $M_3$) which are located at different points, and when in the closed position, the respective centers converge to a common center.

2. The slotted fastening ring according to claim 1, wherein in a region of the ring tips, there are formed at least one tool engaging element for compressing or expanding, respectively, the fastening ring.

3. The slotted fastening ring according to claim 2, wherein the tool engaging element is formed as rounded openings.

4. The slotted fastening ring according to claim 1, wherein two ring halves are connected to each other to form a single piece, wherein the contour of the inside opening of the ring, when the fastening ring is not installed, has a radius ($R_2$) in a first region which is located diametrically opposed to the slot, which is approximately as large as the radius ($R_1$) of the inside opening of the ring when installed.

5. The slotted fastening ring according to claim 4, wherein on each ring half, a second region abuts the first region wherein the radius ($R_3$) of the contour of the inside opening of the second region, when the fastening ring is not installed, is approximately twice as large as the radius ($R_2$) in the first region.

6. The slotted fastening ring according to claim 5, wherein, on each ring half, a third region abuts the second region wherein the radius ($R_4$) of the contour of the inside opening of the third region, when the fastening ring is not installed, is approximately as large as the radius ($R_2$) in the first region.

7. The slotted fastening ring according to claim 1, wherein the minimum width ($x_3$) of the slot, when the fastening ring is not installed, is slightly larger than or is as large as twice the radius ($R_2$) of the contour of the inside opening of the ring in a first region.

8. The slotted fastening ring according to claim 1, wherein the fastening ring is formed as a stamped sheet metal part.

9. The slotted fastening ring according to claim 1, wherein on each ring half, a third region abuts a second region wherein the radius ($R_4$) of the contour of the inside opening of the third region, when the fastening ring is not installed, is approximately as large as the radius ($R_2$) in the first region.

* * * * *